United States Patent
Lin et al.

(10) Patent No.: US 10,099,424 B2
(45) Date of Patent: *Oct. 16, 2018

(54) AIR ADSORBING AND SOUND ABSORBING STRUCTURE

(71) Applicant: Bose Corporation, Framingham, MA (US)

(72) Inventors: Lifun Lin, Lincoln, MA (US); Jason Loureiro, West Boylston, MA (US); Michael Tiene, Franklin, MA (US)

(73) Assignee: Bose Corporation, Framingham, MA (US)

( * ) Notice: Subject to any disclaimer, the term of this patent is extended or adjusted under 35 U.S.C. 154(b) by 128 days.

This patent is subject to a terminal disclaimer.

(21) Appl. No.: 14/973,987

(22) Filed: Dec. 18, 2015

(65) Prior Publication Data
US 2017/0173862 A1 Jun. 22, 2017

(51) Int. Cl.
*B29C 65/74* (2006.01)
*C08J 9/00* (2006.01)
(Continued)

(52) U.S. Cl.
CPC ............. *B29C 65/74* (2013.01); *C08J 9/0061* (2013.01); *C08J 9/0066* (2013.01); *C08J 9/405* (2013.01);
(Continued)

(58) Field of Classification Search
CPC ... B29C 65/74; C08J 2205/05; C08J 2361/28; C08J 2375/04; C08J 2400/22;
(Continued)

(56) References Cited

U.S. PATENT DOCUMENTS

| 7,743,880 | B2 | 6/2010 | Matsumura et al. |
| 8,687,836 | B2 | 4/2014 | Lin |

(Continued)

FOREIGN PATENT DOCUMENTS

| CN | 202401607 U | 8/2012 |
| CN | 102786710 A | 11/2012 |

(Continued)

OTHER PUBLICATIONS

The International Search Report and the Written Opinion of the International Searching Authority dated Feb. 9, 2017 for PCT Application No. PCT/US2016/064948.

(Continued)

*Primary Examiner* — Vishal I Patel
(74) *Attorney, Agent, or Firm* — Brian M. Dingman; Dingman IP Law, PC

(57) ABSTRACT

An air adsorbing and sound absorbing structure with a first portion comprising a first material comprising an open-celled foam with an air-adsorbing material coupled to the foam, where the first portion has a first air adsorption capacity and a first density. There is a second portion fixed to or integral with the first portion, wherein the second portion comprises one or more of: a different material than the first material, a second air adsorption capacity that is different than the first air adsorption capacity, and a second density that is different than the first density.

24 Claims, 11 Drawing Sheets

(51) Int. Cl.
*C08J 9/40* (2006.01)
*C08J 9/42* (2006.01)
*H04R 1/28* (2006.01)

(52) U.S. Cl.
CPC .................. *C08J 9/42* (2013.01); *H04R 1/28* (2013.01); *C08J 2205/05* (2013.01); *C08J 2361/28* (2013.01); *C08J 2375/04* (2013.01); *C08J 2400/22* (2013.01); *C08J 2400/24* (2013.01)

(58) Field of Classification Search
CPC .... C08J 2400/24; C08J 9/0061; C08J 9/0066; C08J 9/405; C08J 9/42; H04R 1/28
See application file for complete search history.

(56) References Cited

U.S. PATENT DOCUMENTS

| | | | |
|---|---|---|---|
| 8,794,373 B1* | 8/2014 | Lin | B01D 53/0407 181/151 |
| 2004/0031642 A1 | 2/2004 | Hokkirigawa et al. | |
| 2008/0275151 A1* | 11/2008 | Strandburg | A61L 15/24 521/143 |

FOREIGN PATENT DOCUMENTS

| | | |
|---|---|---|
| CN | 103358653 A | 10/2013 |
| CN | 103556723 A | 2/2014 |
| JP | H09157110 A | 6/1997 |
| JP | 2009175469 A | 8/2009 |
| JP | 5340115 B2 | 11/2013 |
| WO | 2013062271 A1 | 5/2013 |
| WO | 2013081564 A2 | 6/2013 |

OTHER PUBLICATIONS

Database WPI Week 201377, Thomson Scientific, London, GB; AN 2013-E38195, XP002766088,—& CN 102 786 710 A (Ji Q), Nov. 21, 2012 (Nov. 21, 2012), abstract, examples 1, 2.
Database WPI, Week 199734, Thomson Scientific, London, GB; AN 1997-369342, XP002766089,—& JP H09 157110 A (Tokyo Packs KK), Jun. 17, 1997 (Jun. 17, 1997), abstract, paragraph [0007]-paragraph [0011], paragraph [0023].

* cited by examiner

AIR ADSORBING AND SOUND ABSORBING STRUCTURE

BACKGROUND

This disclosure relates to an air adsorbing and sound absorbing structure.

Sound absorption is often accomplished with fiberglass or other fibrous materials that convert energy from pressure waves into heat. However, often a substantial thickness of the material is needed to achieve sufficient sound attenuation. It would be desirable to attenuate sound using less material.

Three-dimensional air adsorbing structures can be used to increase the apparent volume of a loudspeaker enclosure. However the space available for the structure can be small and irregular.

SUMMARY

All examples and features mentioned below can be combined in any technically possible way.

In one aspect, an air adsorbing and sound absorbing structure includes a first portion comprising a first material comprising an open-celled foam with an air-adsorbing material coupled to the foam, where the first portion has a first air adsorption capacity and a first density. There is a second portion fixed to or integral with the first portion, wherein the second portion comprises one or more of: a different material than the first material, a second air adsorption capacity that is different than the first air adsorption capacity, and a second density that is different than the first density.

Embodiments may include one of the following features, or any combination thereof. The foam can be made from materials such as open-cell polymers, or materials other than polymers such as metals or ceramics. The foam may comprise a skeletal, porous open-celled foam scaffold having scaffold openings distributed within the volume of the scaffold, where the scaffold openings make up at least about 50% of the volume of the scaffold. The foam may comprise a polymer foam, or a melamine-based foam, or a polyurethane-based foam, or a metal foam, or a ceramic foam. The air-adsorbing material may comprise air-adsorbing material particles. The air-adsorbing material particles may be coupled to each other to form agglomerates, and the air-adsorbing material particles and agglomerates may be coupled to the foam, using a binder material. The air-adsorption capacity of the air-adsorbing structure may be variable, for example through a thickness of the first portion.

Embodiments may include one of the above and/or below features, or any combination thereof. The first and second portions may each comprise an open-cell foam, and the foams of the first and second portions may have different hydrophilicities. The first portion may comprise a hydrophilic foam skeleton and the second portion may be a more hydrophobic foam. The second portion may be located on an outside surface of the first portion or may be distributed in the volume of the first portion. The second portion may comprise a non-porous material located on a surface of the first portion.

Embodiments may include one of the above and/or below features, or any combination thereof. The foam of the first portion may have a surface, and the air adsorbing material may be coupled to this surface. The second portion may comprise a micro-perforated plate coupled to a surface of the first portion. The first portion may have a graded air adsorption capacity through its thickness or across its area. The foam of the first portion may have a different foam skeletal density or cell size than the foam of the second portion. A foam density difference may be created by compression molding. The first portion may have a varied surface structure that is constructed and arranged to diffuse sound.

Embodiments may include one of the above and/or below features, or any combination thereof. The air-adsorbing material may comprise particles, and the particles may be coupled to each other to form agglomerates, and the air-adsorbing material particles and agglomerates may be coupled to the foam. The structure may have structure openings in the agglomerates and structure openings between agglomerates. These structure openings may or may not be open to the outside environment. The openings in the structure may further comprise one or more channels in the structure. Channels may or may not be open to the environment. Channels may have diameters of greater than the apparent diameter of the structure openings between agglomerates. The channels may comprise one or more of through holes and blind holes. Channels may have different diameters. Channels may have non-uniform diameters. There may be channels in one or in both portions. One or more channels in the first portion may differ from those in the second portion as to one of more of their: dimensions, shape and the directions of their longitudinal axes. The structure may have a varied thickness, and there may be more channel area in thicker locations as compared to thinner locations.

In another aspect a method of fabricating an air adsorbing and sound absorbing structure comprises providing a first foam layer that has a first thickness and a surface, and coating at least some of the surface of the first layer with a second layer comprising an air-adsorbing material. The second layer may have a second thickness that is less than the first thickness In another aspect, a method of fabricating a three-dimensional air adsorbing structure includes providing a three-dimensional portion of an open-celled foam having a starting shape, and forming the portion into a different shape than the starting shape to create a structure. Either before or after the forming step, an air-adsorbing material is coupled to the foam. The result is the formation of a three-dimensional air-adsorbing structure. Also featured is an air-adsorbing and sound absorbing structure made by this method.

Embodiments may include one of the following features, or any combination thereof. The forming step may comprise compression molding, heat setting, machining or cutting, as four non-limiting examples. The foam may comprise a skeletal, porous scaffold having scaffold openings distributed within the volume of the scaffold, where the scaffold openings make up at least about 50% of the volume of the scaffold, and more preferably they may make up at least about 90% of the volume of the scaffold. The foam may comprise an open-celled hydrophilic foam. The foam can be made of materials such as polymers, metals or ceramics.

Embodiments may include one of the above and/or below features, or any combination thereof. The air-adsorbing material may comprise air-adsorbing material particles. The coupling step may comprise providing a binder that couples air-adsorbing material particles to each other to form agglomerates and couples particles and agglomerates to the foam. The binder may comprise a thermoplastic or thermosetting material. The air-adsorbing material and the agglomerates may be coupled to the foam by creating a water-based emulsion of air-adsorbing material, agglomerates of the material, and binder, and then impregnating the foam with this emulsion. The emulsion-impregnated foam may be treated (e.g., dried) at least in part at a temperature below the freezing point of the emulsion. The binder may in certain non-limiting examples comprise an acrylic material or a polyurethane material or a polyacrylate material.

Embodiments may include one of the above and/or below features, or any combination thereof. The three-dimensional air-adsorbing structure may have structure openings in the agglomerates and structure openings between agglomerates. These structure openings may be but need not be open to the outside environment. The openings in the structure may further comprise a plurality of channels in the structure. Channels may or may not be open to the environment. The channels have diameters of greater than the apparent diameter of the structure openings between agglomerates. The channels may be created before or after the air-adsorbing material is coupled to the foam. The channels may comprise through-holes and/or blind holes. The three-dimensional air-adsorbing structure may have a varied thickness, and there may be but need not be more channels (or, more channel area) in thicker locations as compared to thinner locations. The channels may have non-uniform diameters. Some of the channels may have different diameters than other channels.

Embodiments may include one of the above and/or below features, or any combination thereof. The shape that the material is formed to may be any shape; as one non-limiting example it can be a flat shape with a thickness of no more than about 3 mm. The structure may comprise a plurality of separate pieces of foam with air-adsorbing material coupled to it. The separate pieces may be formed such that they interlock or otherwise interfit with each other, so as to create a larger structure comprising a plurality of interlocked/interfitted pieces of foam with air-adsorbing material coupled to it.

Embodiments may include one of the above and/or below features, or any combination thereof. The method may further comprise placing a strengthening insert into the air adsorbing structure. The strengthening insert may be placed either before or after the air adsorbing material is coupled to the foam. The strengthening insert may be located in part in the air adsorbing structure and in part outside of the air adsorbing structure. The strengthening insert may be insert molded along with the foam.

DETAILED DESCRIPTION

Figure 1:
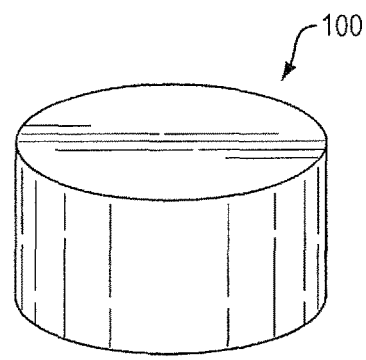
FIG. 1 shows a three-dimensional portion of an open-celled polymer foam.

Disclosed herein are air adsorbing and sound absorbing structures, and methods of fabricating these structures. In particular, a three-dimensional portion of a skeletal open-celled foam has a starting shape and is formed into a different shape than the starting shape to create a structure. Either before or after the forming step an air-adsorbing material is coupled to the foam. The result is the creation of a three-dimensional air-adsorbing and sound absorbing structure. The forming step can create a desired size and shape of the final structure. This allows the structure to be tailored to the particular needs of the situation in which it is going to be used. For example, the air adsorbing structure can be used to increase the apparent volume of a loudspeaker enclosure. In this case the air adsorbing structure should be sized and shaped to fit into available spaces in the enclosure. The structure can also be used for air adsorption or sound absorption in other situations, for example in a speaker port or a waveguide. In such situations it may be desirable to form the air adsorbing structure into a very thin sheet with a thickness of perhaps 2-3 mm so that it can be placed into a port or waveguide and still leave sufficient open volume for the transmission of sound.

Some possible but non-limiting methods that can be used to create desirably sized and shaped air adsorbing structures include creating a 3D open-cell-foam skeletal form by thermally forming a foam skeleton structure or machining an open-cell-foam skeleton to the desire shape and size, followed by impregnating the skeleton structure with the air adsorption material. This sequence of fabrication is a preferred, but not necessary, process to create air adsorbing structures with complicated shapes, since it minimizes waste of air adsorption material. There are cases where the complicated 3D air adsorbing structure is easier to make by first creating an air adsorption structure and then forming or machining it to the final shape.

Some regions inside a product may have more air exposure than the others. Hence, it may be desirable to vary the regional density or air absorbing capacity of the air adsorption material in a 3D air-absorbing structure. The density of a 3D air-absorbing structure is defined as the weight of adsorption material per unit volume of the 3D air-absorbing structure. A 3D air-absorbing structure having different density/capacity in different regions has a distributed density/capacity in the 3D air-absorbing structure.

The air-adsorbing and sound absorbing structures described herein can be used to increase the compliance of a volume such as a loudspeaker enclosure, or a loudspeaker port, or an acoustic waveguide. The box compliance increases associated with the air-adsorbing structure can be gauged by measuring the increase in the apparent volume of a sealed loudspeaker enclosure with and without the air-adsorbing structure (or in some cases, with and without the air-adsorbing material per se, (that is the material not bound to a scaffold)). Box compliance data can be obtained by simultaneously measuring the transducer cone displacement and the pressure inside a sealed acoustic box, when signals are applied to transducer. Box compliance is calculated as cone displacement×cone area/pressure.

When a loudspeaker enclosure or box contains air adsorption material/structure, the measured box compliance will increase. When a fixed amount/volume of air adsorption material/structure is present in a box, the more the box compliance increases, the greater the air adsorption capacity of the air adsorption material/structure.

There are various methods to achieve a distributed density/capacity of air adsorption material. Following are non-limiting examples. One method is to use an open-cell-foam skeleton having different hydrophilicity in different regions. A 3D air-absorbing structure is fabricated by first making a water-based mixture of air adsorption material and binders. Then the water-based mixture is impregnated into the skeleton structure. The hydrophilic region(s) of the open-cell-foam skeleton will retain more water-based mixture to create a region with higher density in the resulting 3D air-absorbing structure. The hydrophobic region(s) of the open-cell-foam skeleton, on the other hand, will retain less water-based mixture and result in a region of lower density in the 3D air-absorbing structure.

The open-cell-foam skeleton may comprise different materials, which may be accomplished by lamination/forming. Different materials will hold different amounts of air adsorption material and create a distributed density/capacity in the 3D air-absorbing structure. In the extreme case, a thermally formed open-cell-substrate can contain inserts which are made of solids that will not retain air-adsorption material. The air-adsorption-material-free inserts can then be used as the sites to attach the 3D air-absorbing structure to the product or to another structure such as a wall.

The air-adsorbing and sound absorbing structures may have two or more portions with different properties that are fixed or coupled together, or the two (or more) portions may be portions of an integral structure. This allows more fine-grained control of both the air adsorbing and the sound absorbing properties of the combined structure to meet a particular need. The structures may have more than two portions of the types described herein.

Illustrative, non-limiting examples of structures according to this disclosure are shown in FIGS. 1-16. Three-dimensional portion 100 made from a skeletal open-celled foam is depicted in FIG. 1. Portion 100 has an arbitrary shape. Portion 100 could become one portion of an air adsorbing and sound absorbing structure. The shape of portion 100 can be changed by forming (e.g., compression molding) portion 100 into structure 120, FIG. 2. Forming can be used to form thin structures (for example foam structures with thicknesses of less than about 3 mm, e.g., around 2-3 mm, or less) that can be difficult to create by machining or cutting of foam due to the fragility of the skeletal open-cell foams described herein. If forming is accomplished by compression molding, structure 120 has a greater skeletal density than portion 100. And, where different portions are compressed to different extent, the density of the skeletal foam is different. For example, portion 123 is compressed substantially more than portion 121, thus the density of the skeletal foam of portion 123 is substantially greater than its density in portion 121. Compression can be used to form the structure, or one or more portions of the structure. Forming of structure 120 can alternatively be accomplished with other known operations such as machining, cutting or heat setting, for example.

Figure 2:
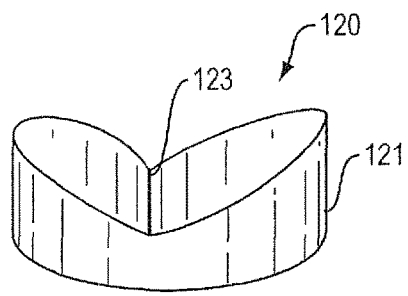
FIG. 2 illustrates a final air adsorbing and sound absorbing structure shape formed from the portion of FIG. 1.
Figure 3:
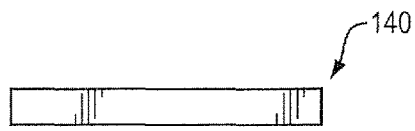
FIG. 3 is a side view of another air adsorbing and sound absorbing structure.

FIG. 2 also illustrates that the final structure shape can be arbitrary. It can be non-uniform as shown, or it can be a flat sheet, for example, as schematically depicted by the side view of flat sheet structure 140, FIG. 3. Any other shape could be made; this disclosure is not limited to any starting or final shape or any method of creating the final shape from the starting shape.

Any forming of a foam into a final shape can be accomplished in different ways depending on the foam materials involved. For foams that can be softened and formed (e.g., polymer foams), compression molding (i.e., applying heat and pressure) may be used. Heat setting, where the foam is heated so as to be pliable, held in the final shape and then allowed to cool so as to set to this final shape (with or without compression of the foam), can also be used. The foam could also be machined or cut in another manner such as with a saw blade. Other manners of changing the shape (and potentially but not necessarily compressing (i.e., increasing the foam skeletal density)) of the foam are known by those skilled in the art, and are within the scope of this disclosure. Compression molding is the presently preferred forming method as the tooling is simple and many shapes and sizes can be formed from larger pieces of the open-celled foam.

Figure 4:
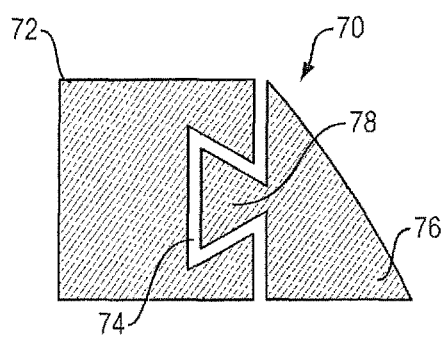
FIG. 4 is a schematic cross-sectional view of a three-dimensional air-adsorbing and sound absorbing structure made from interlocked/interfitted pieces.

FIG. 4 illustrates air-adsorbing structure 70 that comprises two separate but interfitted or interlocked pieces or portions 72 and 76 of the impregnated foam described herein. In this example, pieces 72 and 76 are formed such that they interlock with each other, in this example with mating parts in a manner similar to the manner that jigsaw puzzle pieces fit together. This interfitting is one non-limiting manner in which to create a larger three-dimensional structure comprising a plurality of interfitted or interlocked pieces of foam with air-adsorbing material coupled to it. Interlocking can be accomplished by including recess 74 in piece 72 and projection 78 on piece 76 that has a complementary shape to recess 74. Interfitting could be alternatively accomplished in other ways, such as by sliding engagement of pieces (with or without interlocking of the pieces). The interfitted pieces could be permanently coupled together (e.g., using an insert (described below) or an adhesive, for example), or the coupling could be releasable. The foam can be impregnated before or after the pieces are interfitted. The pieces can have different air adsorption capacities. In some cases a region can comprise an unimpregnated foam scaffold which is used to protect the air-adsorption structure.

Figure 5:
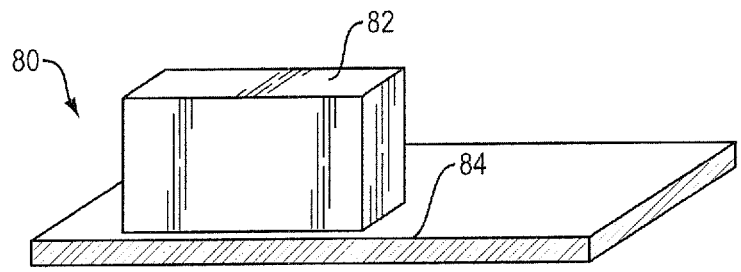
FIG. 5 illustrates a three-dimensional air-adsorbing and sound absorbing structure coupled to a surface.
Figure 6:
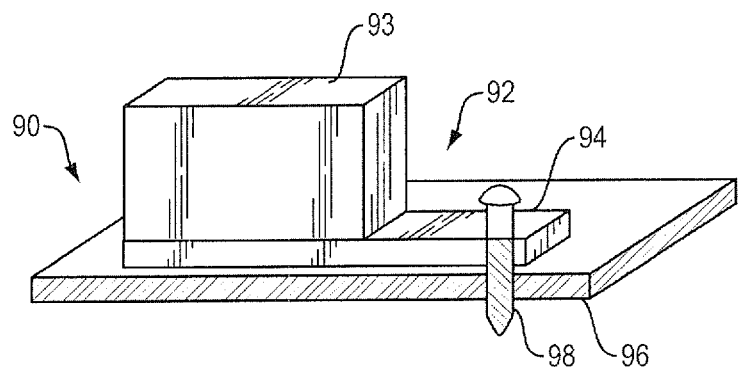
FIG. 6 illustrates a three-dimensional air-adsorbing and sound absorbing structure with an internal support, coupled to a surface.
Figure 7:
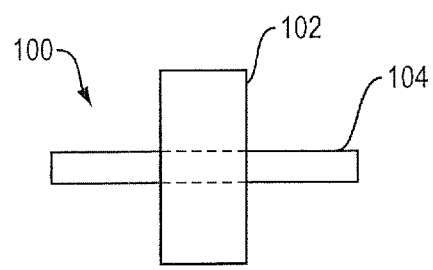
FIG. 7 illustrates a three-dimensional air-adsorbing and sound absorbing structure with an internal support.

One or more inserts may also be included in the air adsorbing structure. See FIGS. 5-7. The inserts can provide strength and/or can assist with mounting the air adsorbing structure, for example. Air-adsorbing structure 82, FIG. 5, is meant to be coupled/attached to surface 84. An adhesive or a mechanical fastener can potentially be used. However, some skeletal polymer foams do not have sufficient strength to carry a mechanical fastener, and some foams are so open that they are difficult to adhere to surfaces. Coupling to a surface can be accomplished or enhanced with an insert that is embedded or otherwise coupled to the foam. The insert can be stronger or easier to couple to a surface via adhesive than the foam per se. Coupled air-adsorbing structure 90, FIG. 6, includes insert 94 that is coupled to or located in part within the body of foam piece 93. Insert 94 can be coupled to separate surface 96 via mechanical fastener (e.g., screw or bolt) 98. The strengthening insert can be placed in the foam either before or after the foam is impregnated with air-adsorbing material. As shown by air-adsorbing structure 100, FIG. 7, strengthening insert 104 may be located in part in the air adsorbing structure 102 and in part outside of the air adsorbing structure. This can facilitate attachment to another surface. The strengthening insert may be insert molded, in other words placed into the mold within which the foam is formed, before the foam is formed in the mold. Or, the insert can be placed after the foam is created via molding.

The air adsorbing structure herein created from open-celled foam serves to both increase the apparent volume of a space and also absorb sound, i.e., to damp sound. It has been demonstrated that the melamine based foam with zeolite-based air adsorbing material coupled to the foam described elsewhere herein is also an effective sound absorber. As noted above, an integral sound adsorbing structure can have multiple portions that differ in some material manner. Such differences can include but are not limited to the air adsorption capacity and/or the sound absorption capacity. This provides greater flexibility in designing a structure to meet a particular need in an acoustic application. In some examples, one portion of the structure has an open-cell foam (e.g., a polymer foam) with an air-adsorbing material coupled to the foam. This portion has a first air adsorption capacity and a first density. The second portion of the structure can be made from a different material (or the same material) than the first portion. The second portion may have a different air adsorption capacity than the first portion. The second portion may have a different density than the first portion. The resulting structure can be used, for example, to accomplish one or both of increased apparent volume of an enclosure, and effective sound absorption.

One or both portions of the structure can be arranged to absorb sound. The structure turns energy from the sound pressure waves to heat and thereby attenuates or absorbs sound. Fiberglass is an example of a material that is commonly used for sound absorption. The air adsorption capacity of the structures disclosed herein is effective to provide sound absorption at lower frequencies, which are typically but not necessarily frequencies below about 1000 Hz. A skeletal open-cell foam as described herein that can be used for either or both of the first and second portions is itself an effective sound absorber even at higher frequencies, for example frequencies greater than 1000 Hz, but their performance at low frequency is poor unless very thick foam is used. The air adsorbing structure of this invention can be used in any situation in which fiberglass is currently used to absorb sound. This material can achieve the same sound absorption results, or better results, with less thickness than can be achieved with a fiberglass mat. Thus, the structures described herein can be used to replace fiberglass mats in any sound absorption application in which fiberglass is currently used.

Figure 8:
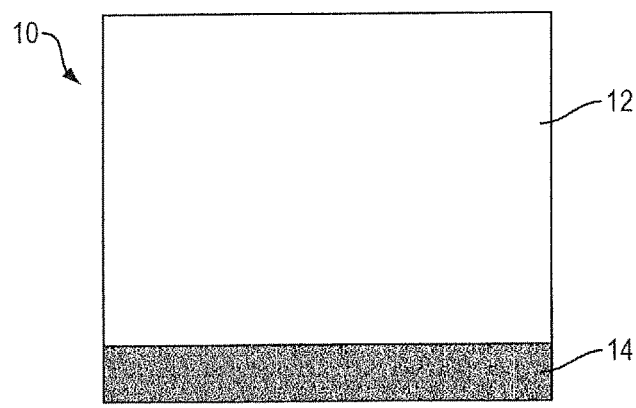
FIG. 8 is a schematic cross-sectional view of an air adsorbing and sound absorbing structure.
Figure 9:
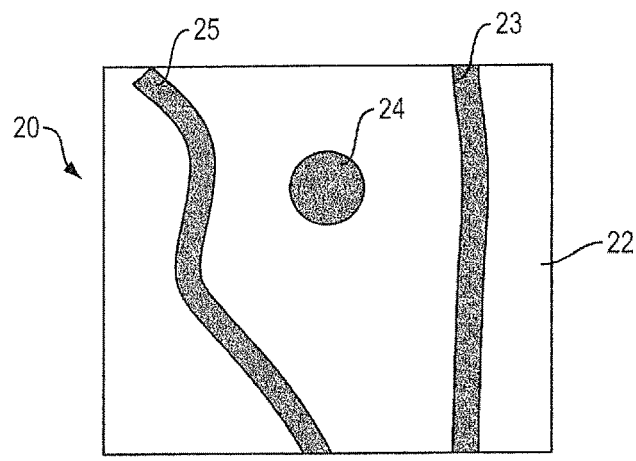
FIG. 9 is a schematic cross-sectional view of an air adsorbing and sound absorbing structure.

Air adsorbing and sound absorbing structure 10, FIG. 8, includes first portion 12 and second portion 14. First portion 12 comprises a first material comprising an open celled foam with an air adsorbing material coupled to the foam. The first portion has a first air adsorption capacity and a first density. Second portion 14 can be integral with or fixed to or coupled to first portion 12. Second portion 14 may (or may not) comprise a different material than first portion 12. Second portion 14 has a second air adsorption capacity that can be the same as or different than the air adsorption capacity of first portion 12. Second portion 14 has a density that can be the same as or different than the density of first portion 12. At least one of the material or acoustic properties of the two portions is different. Portions 12 and 14 are either integral (that is, they are different portions of a single structure), or they may be separate portions that are fixed or coupled together to form an air adsorbing and sound absorbing structure 10. Structure 10 can comprise different portions that are created or coupled by forming or by lamination or adhesion, for example. The portions can be made of different materials that will hold different amounts of air adsorption material particles (as described elsewhere herein) so as to result in a structure with a distributed air adsorbing material density/capacity and thus a distributed air adsorption capacity. In one non-limiting case a thermally formed open-cell substrate can contain inserts; such inserts can have more or less air adsorption capacity than the substrate, and can be solid inserts that do not retain air adsorption material particles and thus may have no or little air adsorption capacity. Such inserts can be used as sites to attach the structure to a surface, such as a loudspeaker enclosure, a loudspeaker port, a waveguide, or a wall, for example. In one example (such as described below relative to FIG. 10) the second portion covers some or all of the outside of the first portion; this second portion may or may not be impervious to air. The second portion may contain the first portion, and/or it may protect the first portion.

The foam of the first portion 12 can be but need not be a polymer foam. The foam could be from made from another material such as metal or ceramic. Certain foams, and some of their properties, are described further below. Preferably, the foam is a skeletal open-celled hydrophilic foam. One non-limiting example of such a foam is a melamine based foam. Another example is a polyurethane-based foam. Also as is further described below, the air adsorbing material preferably but not necessarily comprises small particles of air adsorbing material that are coupled to the foam, for example using a binder. Binders can include but are not limited to materials such as an acrylic material, a polyurethane material, or a polyacrylate material. The binder can be thermosetting or thermoplastic, for example.

Figure 10:
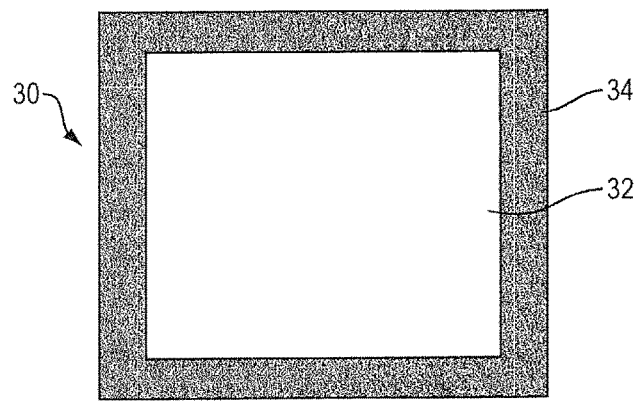
FIG. 10 is a schematic cross-sectional view of an air adsorbing and sound absorbing structure.
Figure 11:
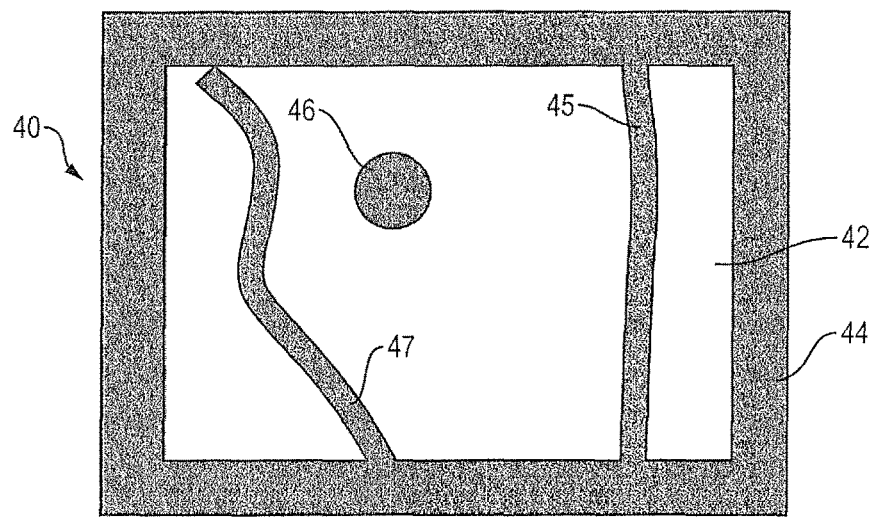
FIG. 11 is a schematic cross-sectional view of an air adsorbing and sound absorbing structure.

As shown in FIG. 8, in one example second portion 14 is located on an outside surface of first portion 12. One alternative physical arrangement is illustrated by structure 20, FIG. 9, in which the second portion comprises distributed volumes 23, 24 and 25 that are located within and/or on an outside surface of first portion 22. Another of the many possible arrangements of the first and second portions is shown in FIG. 10 in which structure 30 comprises first portion 32 that is embedded within second portion 34. Alternatively, the second portion may be embedded in the first portion. Structure 40, FIG. 11, includes first portion 42 that is embedded within second portion 44, where second portion 44 also includes volumes 45, 46 and 47 which are located within and distributed within first portion 42. There are almost unlimited possibilities of physical arrangements of the first and second portions, depending on the design goals of the structure; these aspects are further described below.

Structures disclosed herein can have a second portion that has very little or no air adsorption capacity. One means by which this result can be accomplished is to make both portions of the same open celled foam but couple more air adsorbing material to the foam of the first portion than the foam of the second portion. Examples of how this can be accomplished are described elsewhere. The second portion with low adsorption can be used for various functions. Examples include its use as an air duct, its use as a region to allow the structure to be attached to another surface, physical protection of the structure, to prevent loose particles from leaving the structure and potentially contaminating other volumes, and its use as a sound partition or structure.

The second portion can be made from the same foam as the first portion, or not. The second portion can be a completely different material than the first portion. For example a second portion can be a non-porous material such as a plastic film or sheet, or a metal sheet or foil. The second portion could alternatively be a porous material such as a high damping or hydrophobic foam, for example a typical polyurethane foam. The second portion can be initially a separate portion that is then fixed to the first portion, for example by lamination, using an adhesive or another means of fixing the two portions together. The portions can be separate pieces of foam material that are coupled together in any convenient manner, such as with mating parts like jigsaw puzzle pieces (or otherwise interfitting two or more three-dimensional pieces). As non-limiting examples, if the second portion is a foil it can be adhered to one surface of an air adsorbing foam. An adhesive (e.g., a pressure sensitive adhesive or a liquid adhesive) could be used as the second portion instead of a foil or film.

Figure 12:
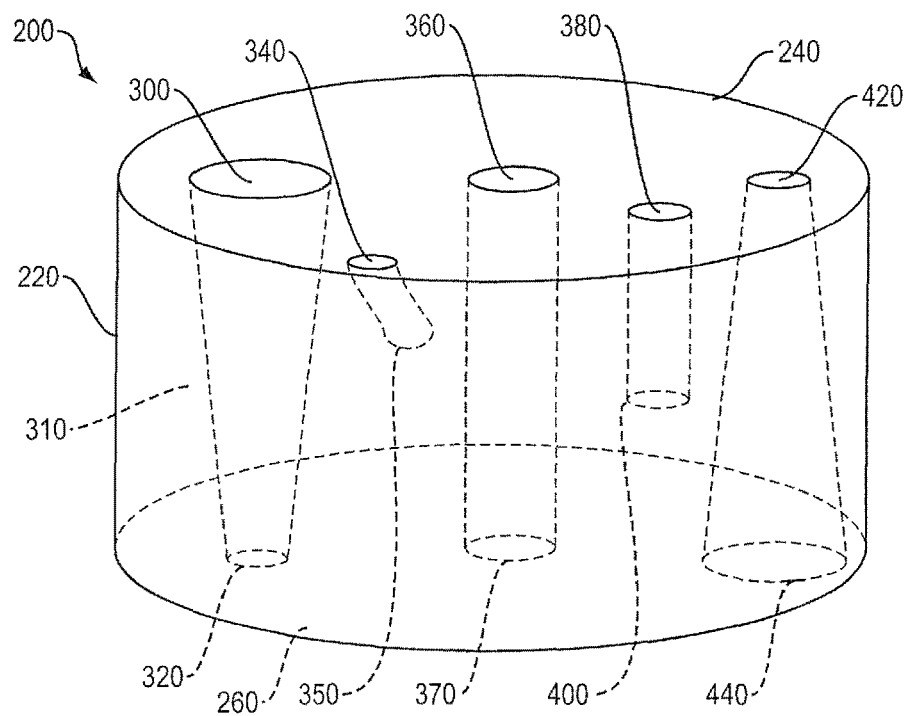
FIG. 12 conceptually illustrates an air-adsorbing and sound absorbing structure with channels.
Figure 13:
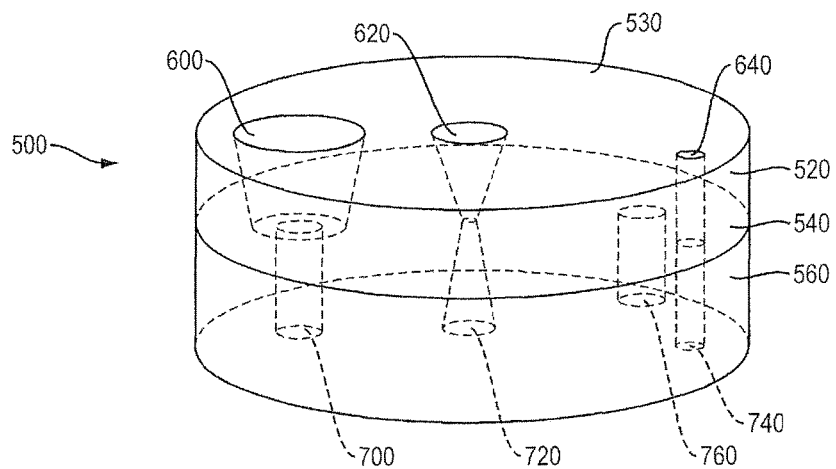
FIG. 13 conceptually illustrates an air adsorbing and sound absorbing structure with channels.
Figure 14:
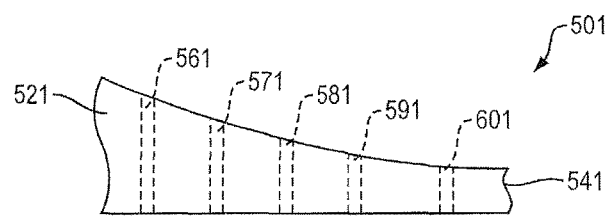
FIG. 14 is a side view of an air-adsorbing and sound absorbing structure with channels.
Figure 15:
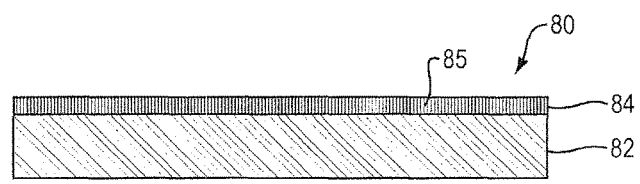
FIG. 15 is a schematic cross-sectional view of an air adsorbing and sound absorbing structure.

The air-adsorbing and sound absorbing structure may have structure openings in agglomerates of air-adsorbing particles, and structure openings between the agglomerates, where the structure openings are in some but not all cases open to the outside environment. The openings in the structure may also include one or more channels in the structure. The channels may or may not be open to the environment. The channels may have diameters of greater than the apparent diameter of the structure openings between agglomerates. Non-limiting examples of such channels are illustrated in FIGS. 12-14. One reason for such channels is to allow air ingress and egress to the foam structure in such a manner that the air is able to penetrate the foam and reach the cells of the foam, as well as the air-adsorbing particles. If air does not reach air-adsorbing particles, such particles do not contribute to the air adsorption accomplished by the structure. The structure can thus be designed to include channels that are effective to expose most or preferably substantially all of the air-adsorbing material and foam cells to air, depending on the frequency of the sound. Channels or cavities that are not open to the outside environment can be useful for acoustic purposes, such as modifying a resonance of a cavity in which the structure is located.

As an example an acoustic box with two types of adsorption structures was evaluated. Type 1 is an adsorption structure with channels (i.e., through holes). Type 2 is an adsorption structure without any channels. Both adsorption structures are disks of 29 mm diameter and 13.5 mm thick. Type 1 has six spaced channels of 3 mm diameter through the thickness of the disk. Type 2 does not have any channels. Both acoustic structures have the same external volume. Table 1 illustrates the ratio of the box apparent volume with the adsorption structure vs. the same box without adding acoustic-adsorption structure (referred as empty), at 100 Hz and 200 Hz. The channels increased the apparent volume of an enclosure.

TABLE 1

|  | 100 Hz | 200 Hz |
| --- | --- | --- |
| Box with type 1: empty | 1.9 | 1.7 |
| Box with type 2: empty | 1.5 | 1 |

Three-dimensional air-adsorbing structure 200, FIG. 12, includes formed, generally cylindrical, open-cell polymer foam structure 220 that has air-adsorbing material coupled to it. Structure 220 includes a number of channels, 300, 340, 360, 380 and 420 embedded in structure 220; the channels illustrate various and non-limiting aspects of the channels that can be included in the present structures. The channels can be created either before or after the air-adsorbing material is coupled to the foam scaffold. Creating the channels in the foam before it includes the air-adsorbing particles can have the advantage of less waste of air-adsorbing particles, as the foam material is removed to form the channels before particle impregnation.

Channel 300 illustrates a channel with non-uniform diameter, in this case where the top opening of channel 300 in structure 200 top wall 240 is larger than the bottom opening 320 in structure bottom wall 260, and interior wall 310 is tapered. Also, some of the channels have different diameters than other channels. Channel 340 is a blind channel or hole, meaning that it is open to only one surface of the structure; this is illustrated by bottom 350 being located in the interior of structure 220. Channel 340 also illustrates that the channels can go in any direction; in other words, their longitudinal axes can follow any path within the foam, not just from top to bottom or side to side. Further, the channels need not be straight. Channel 360 has a uniform diameter with the opening in top wall 240 the same size as opening 370 in bottom wall 260. Channel 380 illustrates a blind hole with embedded bottom 400, but of uniform diameter and orthogonal to top surface 240. Channel 420 is outwardly tapered from top to bottom, meaning that its top opening is smaller than its bottom opening 440.

Air adsorbing and sound absorbing structure 500, FIG. 13, includes first portion 520 comprising a skeletal open-celled foam structure that has air-adsorbing material coupled to the foam skeleton, and second portion 560 that is fixed to first portion 520. Aspects of the second portion of an air adsorbing and sound absorbing structure such as structure 500 are described elsewhere herein. Portion 520 includes a number of illustrative channels, 600, 620 and 640, which illustrate various aspects of the channels. The channels can be created either before or after the air-adsorbing material is coupled to the foam scaffold.

Channel 600 illustrates a tapered channel with non-uniform diameter, in this case where the top opening in top wall 530 is larger than the bottom opening in its bottom wall 540. Channel 620 includes interior walls that are more severely tapered than those of channel 600. Any taper can be from top to bottom, or bottom to top. Channel 640 has a uniform diameter, but the channels need not have a uniform diameter. Also, some of the channels can have different diameters than other channels. Channels may be blind holes, meaning that they are open to only one surface and thus air or another fluid cannot flow through the channel, but air can still diffuse into the material and be adsorbed. Channels also can go in any direction; in other words, their longitudinal axes can follow any path within the foam, not just from top to bottom or side to side. Further, the channels need not be straight.

Second portion 560 has channels 700, 720, 740 and 760. These channels can be aligned with or not aligned with channels in first portion 520. When they are aligned, pairs of channels can define holes through the entire thickness of structure 500. When they are not aligned (such as with channel 760), the channels become blind openings. Internal cavities can be created inside an air adsorption structure by aligning a blind hole in one portion with a blind hole in another portion and coupling the portions together.

FIG. 14 illustrates impregnated foam structure 501. Through-channels 561, 571, 581, 591 and 601 are included. The through channels can have arbitrary cross-sectional shapes. The three-dimensional air-adsorbing structure 501 has a varied thickness, with end 521 thicker than end 541. There is more channel area in the thicker location as compared to the thinner location. Thus, channels 561 and 571 in the thickest part are closer together than channels 591 and 601 in the thinner part. Or, different channel area could be accomplished in other ways, such as with channels of different diameters, or non-uniform channels. A goal of this tailored channel area is to provide an overall air passage area that is sufficient to move the air into and out of the structure such that the air reaches the air adsorbing material at the operating frequencies. This goal can be accomplished in other manners, such as by using different shapes, sizes and configurations of channels.

Figure 21:
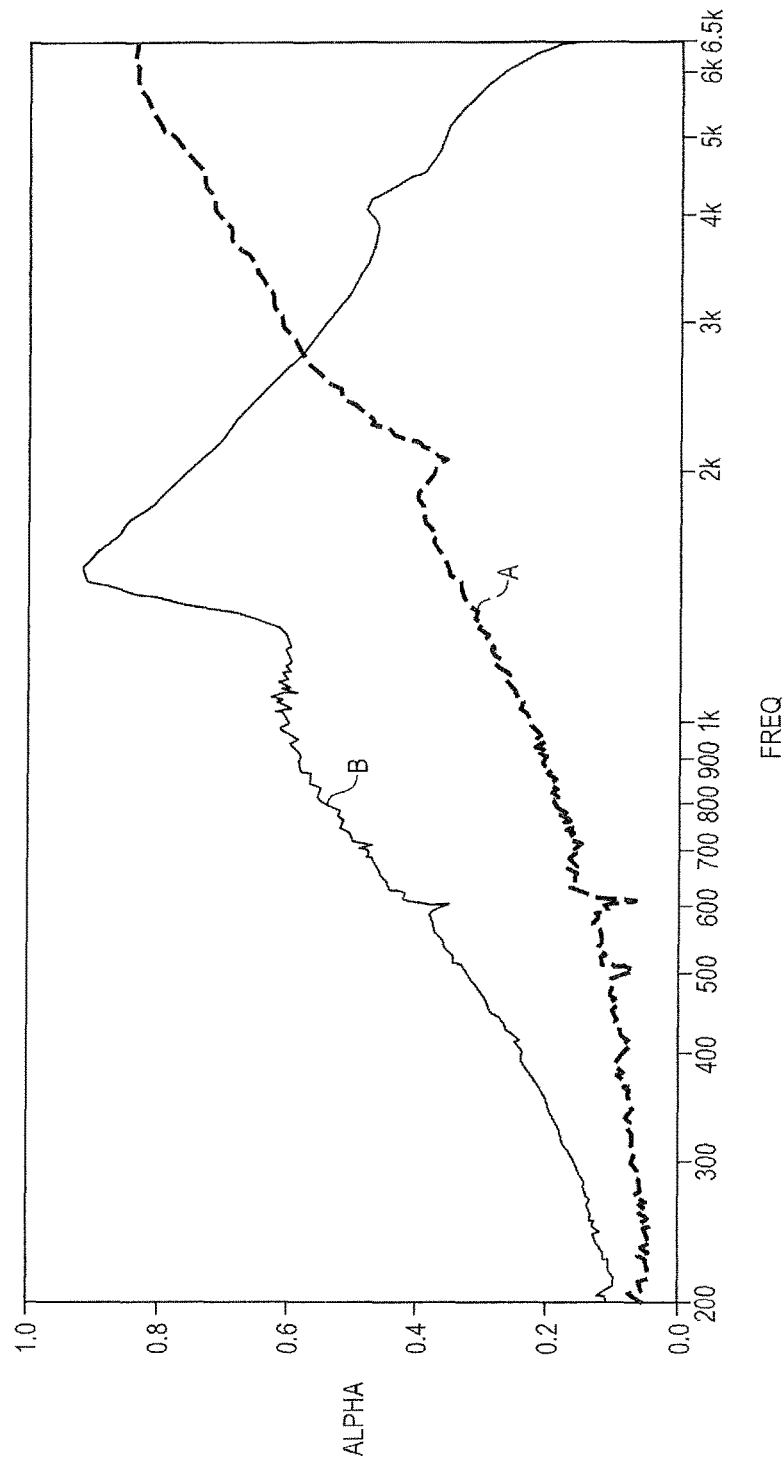
FIG. 21 is a plot of frequency vs. percent of sound absorbed comparing an air adsorbing and sound absorbing structure of the present disclosure to a foam material.

The structure herein can also be used along with (or in place of) a micro-perforated plate (MPP). MPP structures are known in the art. Structure 80, FIG. 15, includes a thin panel 84 with a number of micro-perforations 85 through its thickness. Panel 84 comprises the second portion of structure 80. There is a layer 82 of air adsorbing material (as described elsewhere herein) that comprises the first portion of structure 80. Depending on the application, an air gap between first portion 82 and second portion 84 can be included so as to achieve greater sound absorption. As an alternative, panel 82 is melamine foam and layer 84 is a thin layer of Zeolite sprayed on top of panel 82. Or, panel 82 is 3D air-adsorption structure, and layer 84 is a sprayed on porous layer. These configurations create a material that can behave like a Helmholtz resonator or a common MPP with an air pocket beneath the MPP. The performance of one example of structure 80 is illustrated in FIG. 21

Figure 16:
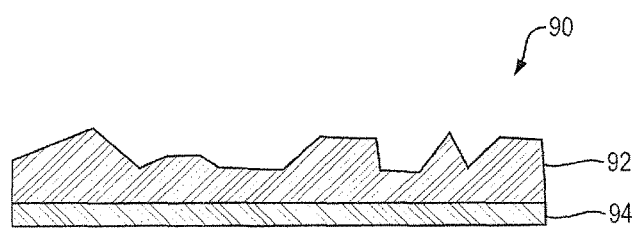
FIG. 16 is a schematic cross-sectional view of an air adsorbing and sound absorbing and diffusing structure.

Structure 90, FIG. 16, comprises air-adsorbing and sound absorbing first portion 92 that has a varied surface geometry (illustrated very conceptually in the drawing) that is effective to diffuse sound. Such diffusing surface geometries are well known in the art and so are not further described herein. The use of a material with high air adsorption and sound absorption capacity as portion 92 helps to further attenuate sound impinging on the exposed surface of portion 92. The result is a more effective diffuser. In this case second portion 94 can be used to couple structure 90 to a surface such as a wall. Examples of second portion 94 can include structural layers such as wood or metal, or an adhesive layer, or an adhesive backed film that can be adhered to a surface on which it is desired to accomplish sound diffusion.

Figure 17:
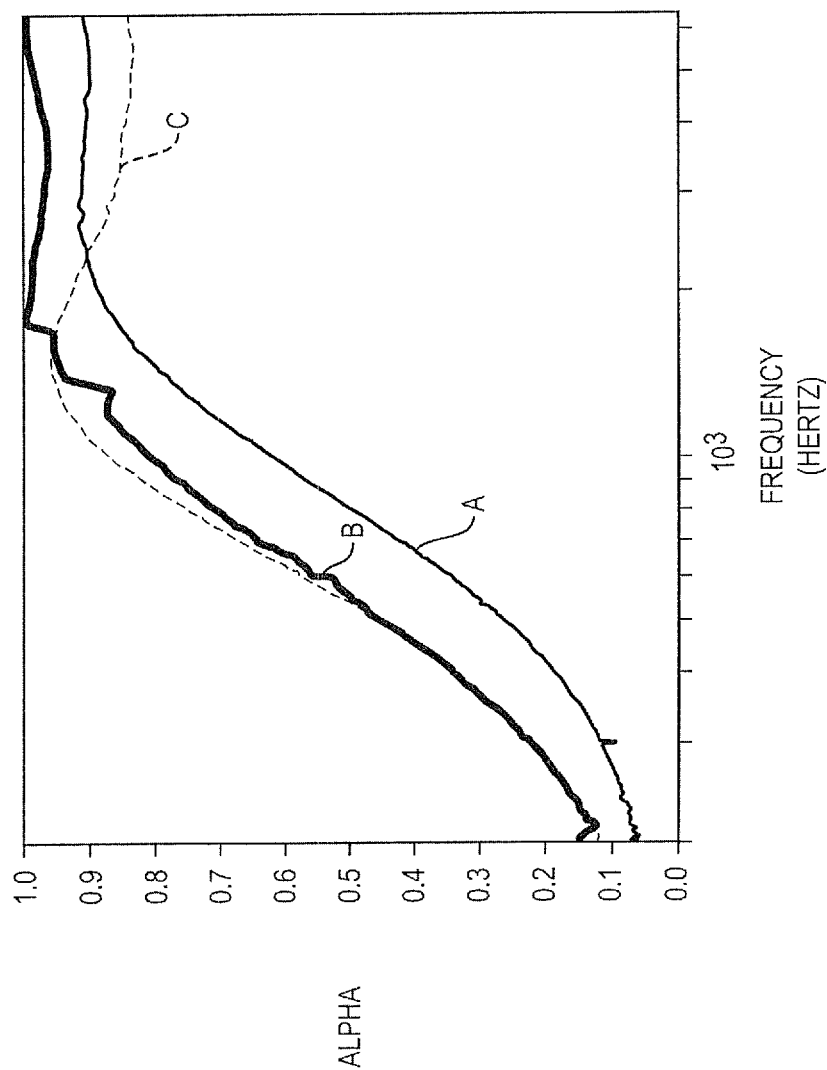
FIG. 17 is a plot of frequency vs. percent of sound absorbed comparing an air adsorbing and sound absorbing structure of the present disclosure to two prior art fiberglass mats.

FIGS. 17-21 are plots that illustrate testing of various features of the air adsorbing and sound absorbing structures disclosed herein. FIG. 17 illustrates the alpha at various frequencies for three materials. Alpha is measured using an impedance where an alpha of 1 equals 100% sound absorption. (see ISO 10534_2).

Since alpha is a function of frequency, it can be difficult to compare materials using alpha curves. The industry desires to have a single value to represent a material. According to ASTM C423, a single number rating is called Sound Absorption Average (SAA). SAA is obtained by averaging the absorption coefficients for the twelve one-third octave bands from 200 to 2500 Hz. Curve A is for a prior art fiberglass mat with a thickness of 23 mm and an SAA of 0.457. Curve B is for a different prior art fiberglass mat with a thickness of 50 mm and an SAA of 0.595. Curve C is for an inventive melamine foam with an air adsorbing material of the type described herein with a thickness of 13.5 mm and an SAA of 0.597. As can be seen the performance (the alpha) of the melamine foam with sound absorbing material is substantially better than a fiberglass mat of almost twice the thickness at frequencies up to about 2000 Hz.

Figure 18:
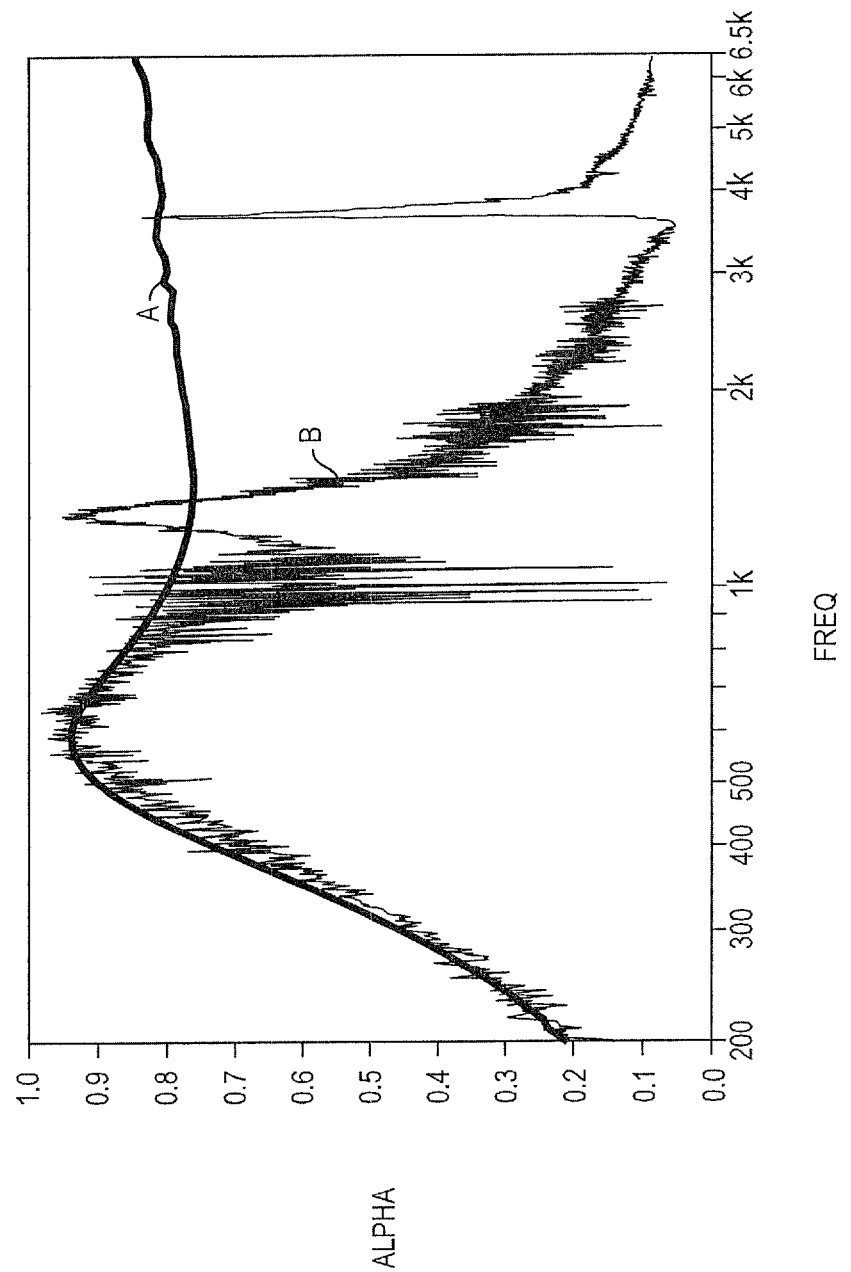
FIG. 18 is a plot of frequency vs. percent of sound absorbed comparing an air adsorbing and sound absorbing structure of the present disclosure to a prior art micro perforated plate.

FIG. 18 is a similar plot comparing a 23 mm thick air adsorption structure made of melamine foam with air absorbing material (curve A) to a 51 mm thick prior art MPP sound absorption structure (2 mm thick perforated plate plus 49 mm of air cavity) (curve B). The performances (the alphas) of the two materials up to about 1000 Hz is very similar but at half the thickness for the inventive material.

Figure 19:
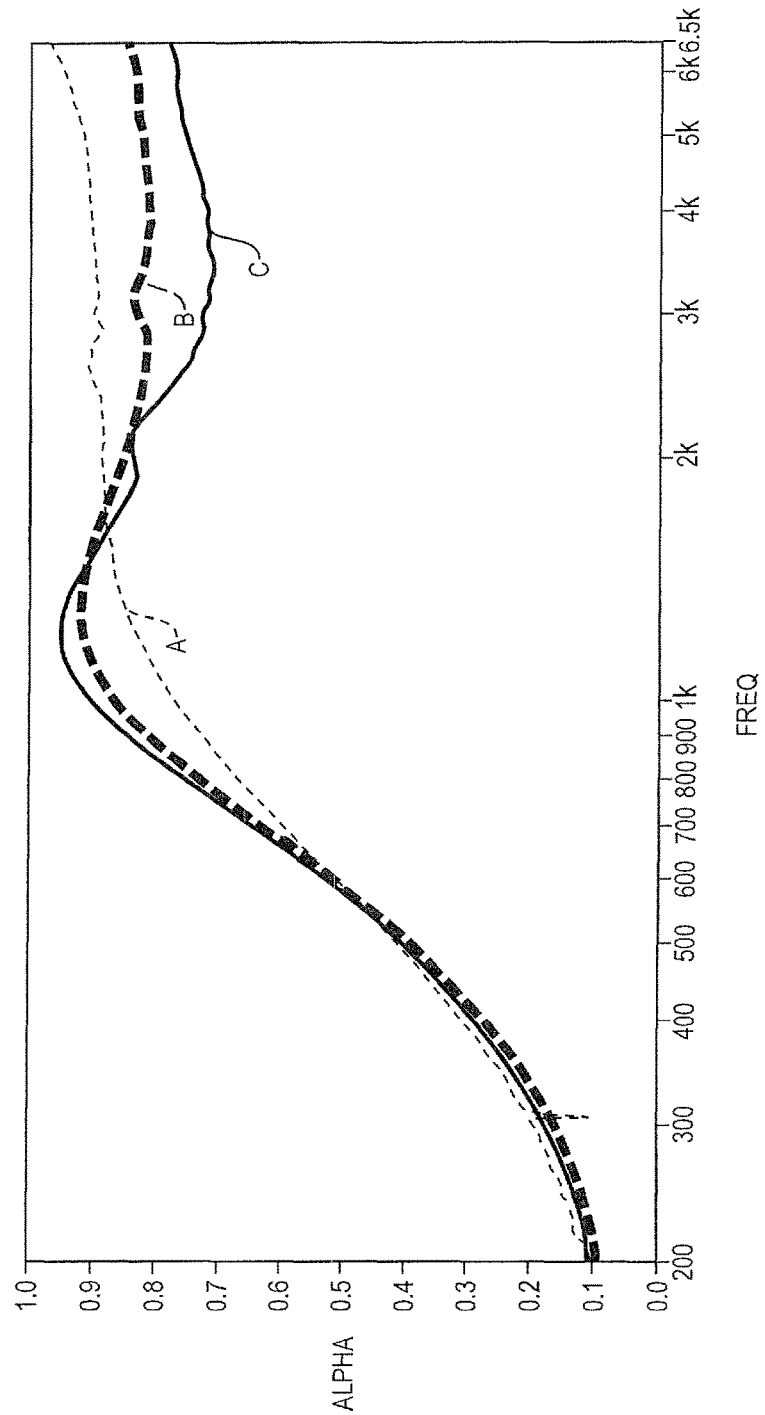
FIG. 19 is a plot of frequency vs. percent of sound absorbed comparing three different air adsorbing and sound absorbing structures of the present disclosure.

FIG. 19 illustrates performance (alpha) for three samples of the melamine foam with adsorbing material as described herein of the same size and thickness, with each sample having about the same total amount of air adsorbing material. Each sample is composed of two layers of 3-D air absorbing structure. The testing was conducted with one layer facing a sound source and the second layer behind or underneath the first layer, thus facing away from the sound source. The sample of curve A has a total air adsorption material weight of 3.102 g; the layer facing the sound source has lower amount of air adsorption material (1.141 g) and the layer behind the first layer and thus farther away from the sound source has higher amount of air adsorption material (1.961 g). Curve B is for a sample with total weight of 3.052 g, both layers have same amount of air adsorption material (1.526 g each). The sample of curve C has a total weight of 3.102 g; the layer facing the sound has higher amount of air adsorption material (1.961 g) and the layer farther away from the sound source has lower amount of air adsorption material (1.1141 g). These curves established that depending on the target noise frequency range, the 3-D air-absorption structure can be fine tuned to meet the application requirement based on the distributed density/capacity concept while keeping the total amount of air-adsorption material similar.

The density in above example in FIG. 19 has step change. The benefit can also be achieved by creating a graded (i.e., varied) density of air-adsorbing material particles. This can be accomplished by letting the air-adsorption material settle before drying. During settling some of the solid air adsorption material will sink toward the bottom of the foam. When the foam is fabricated, the regions near the top will have less air-adsorption material and thus less adsorption capacity than regions near the bottom. A similar result can be accomplished in other fashions, such as by pulling a vacuum on one side of the foam to create the gradient in concentration, before the slurry is dried. Alternatively, separate portions of foam with differing concentrations of air-adsorbing material particles (e.g., impregnated with slurries having different particle concentrations) can be coupled or fixed together to create a structure. Another way to accomplish graded concentration of air-adsorbing material particles in different regions of the structure is to create regions or portions of the foam skeleton with different hydrophilicities. Then when a water-based mixture that includes the air adsorbent particles is impregnated into the structure the different regions will retain different amounts of the mixture. After drying, the result will be differing concentrations of particles in the different regions.

Figure 20:
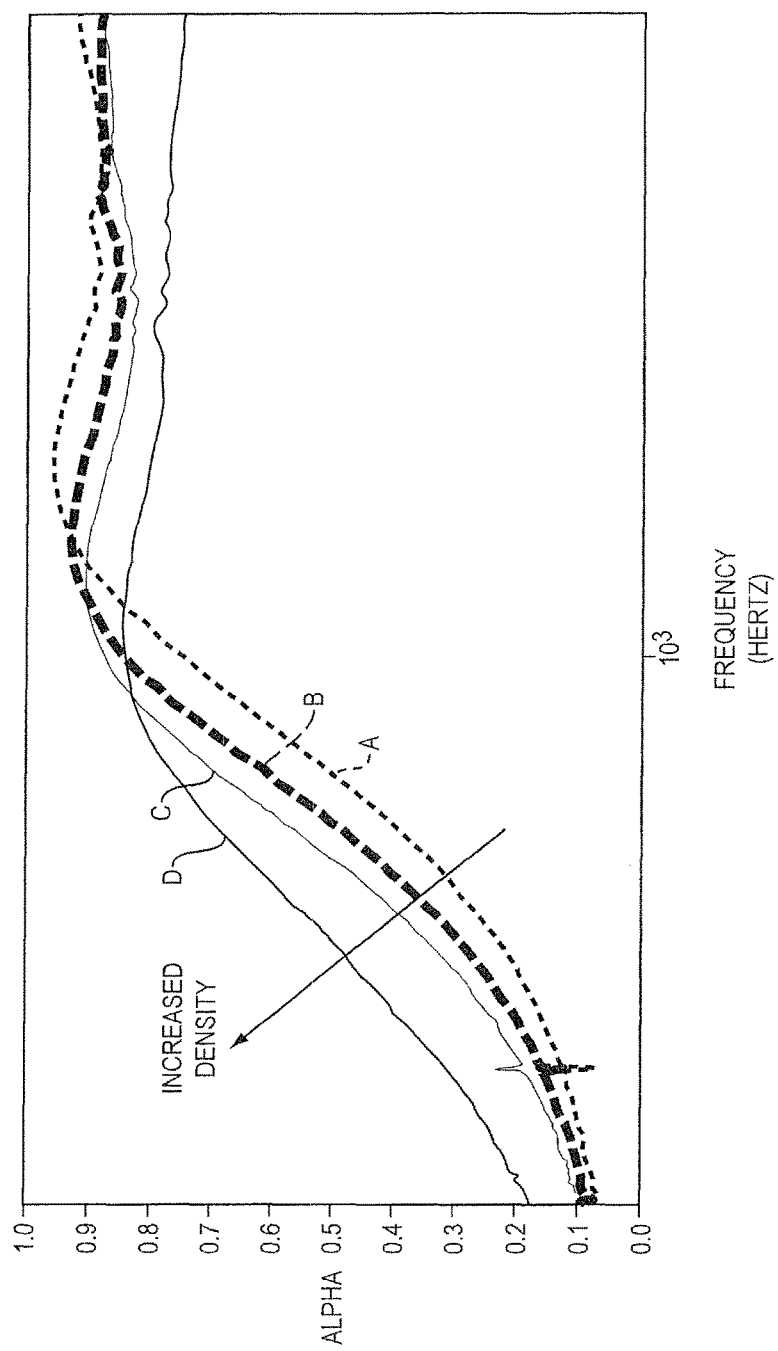
FIG. 20 is a plot of frequency vs. percent of sound absorbed comparing four different air adsorbing and sound absorbing structures of the present disclosure.

FIG. 20 also illustrates the effects of 3D air-adsorption structure density. The four pieces of melamine foam with adsorbing material as described herein that were tested were the same size and thickness, but had different weights (thus, different amounts of air adsorbing material), and thus different densities. Curve A had a weight of 2.298 g and an SAA of 0.507, curve B a weight of 2.749 g and an SAA of 0.548, curve C a weight of 3.176 g and an SAA of 0.567, and curve D a weight of 4.297 g and an SAA of 0.611. Increased density leads to higher alpha at frequencies up to about 900-1000 Hz.

FIG. 21 illustrates testing of a 13 mm thick layer of un-impregnated melamine foam, with a thin coating of adsorbent material (e.g., a mixture of binder, zeolite and water, or an activated carbon) sprayed onto the top (exposed) surface of the un-impregnated foam. This coating was applied to the level of about 0.062 $g/cm^2$. Curve A is a test of the foam material without the coating, and curve B is a test of the foam with the coating material. This establishes that at frequencies up to about 2800 Hz a very thin coating of the air adsorbing material very substantially increases sound absorption.

The air-adsorbing and sound absorbing structures according to this disclosure can include a three-dimensional, lightweight, unitary, skeletal, low-solid volume, porous open-celled foam scaffold having scaffold openings that are open to the environment. The scaffold is preferably an open-celled polymer foam. In one non-limiting example the scaffold openings make up at least about 50% of the volume of the foam; the scaffold openings preferably make up at least about 90% of the volume of the foam. The structure also includes air-adsorbing material particles. In one non-limiting example, a hydrophobic binder is used to couple air-adsorbing material particles to each other to form agglomerates and couples particles and agglomerates to the foam scaffold. Air adsorbing structures and their fabrication and uses are further known in the art, for example as disclosed in U.S. Pat. No. 8,794,373, the entire disclosure of which is incorporated herein by reference.

The air-adsorbing and sound absorbing structure has structure openings in the agglomerates and structure openings between agglomerates. At least some of the structure openings are preferably open to the environment so that the air-adsorbing and sound absorbing material that is exposed to a structure opening is able to adsorb and desorb air as the structure is exposed to a time-varying acoustic field. The 3-D air adsorbing structure is also effective to attenuate pressure waves (i.e., absorb sound) via conversion to heat. The material can alter the resonance of the cavity. The air-adsorbing material is typically but not necessarily one or both of zeolite material (typically, a silicon-based zeolite) and powdered or granular activated carbon.

Figure 22:
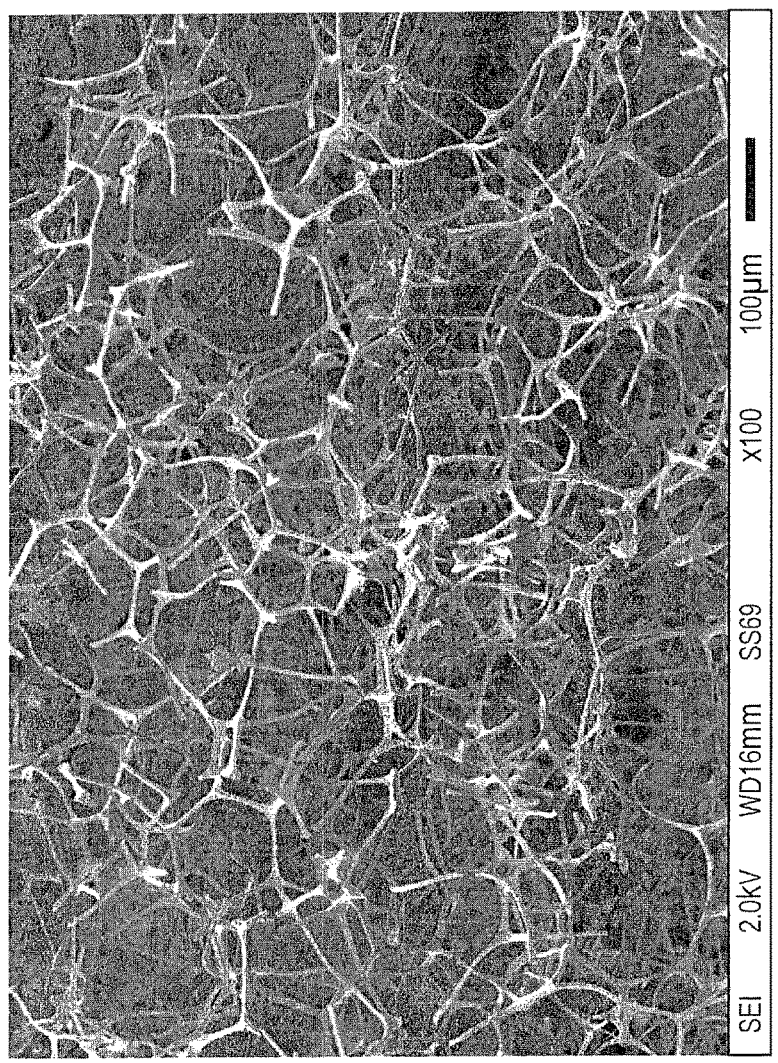
FIG. 22 is a scanning electron micrograph of a polymer foam scaffold (skeleton) for an air-adsorbing and sound absorbing structure.

In non-limiting examples the scaffold can be an open-celled foam, e.g., a polymer foam. Un-compressed foams typically have at least about 10 cells per inch, and more preferably at least about 50 cells per inch. If the foam is compressed (e.g., by forming as described herein), the cell size will decrease and the number of cells per inch will increase. The scaffold openings may make up at least about 90% of the volume of the scaffold. The scaffold preferably has a density of less than about 0.1 g/cc. The scaffold is a very open, skeletal, unitary structure. One example of the scaffold is shown in FIG. 22. This scaffold is an open-celled melamine foam consisting of a formaldehyde-melamine-sodium bisulfate copolymer, available as "Basotect" material from BASF, Germany. The scaffold can be made of other materials, including but not limited to other open-celled hydrophilic polymer foams such as a hydrophilic polyurethane foam, or foams of other materials such as metals or ceramics, for example. Open-cell metal and ceramic foams are available from ERG Materials and Aerospace Corp. of Oakland, Calif. under the brand name Duocel® foam.

The air-adsorbing material (and agglomerates of this material) can be coupled to the foam scaffold by a binder. The binder will act to bind some of the adsorption material powder into agglomerates, and to bind the adsorption material powder and the agglomerates to the foam scaffold. The air-adsorbing structure in some cases may need to be able to operate in humid environments. The binder in this case should preferably not absorb water vapor that would potentially block the openings in the structure and thus prevent air from reaching the material via the openings. Therefore, the binder should have certain minimum hydrophobicity. Non-limiting examples of the binder include an acrylic material, a polyurethane material, or a polyacrylate material. The binder can be thermoplastic or thermosetting. The air-adsorbing material can be added either before the portion of foam scaffold is formed into its final shape, or after the foam scaffold is formed to its final shape.

The air-adsorbing material can be coupled to a foam scaffold by using any appropriate methodology. In one non-limiting example, the coupling is accomplished by creating an emulsion of air-adsorbing material, agglomerates of air-adsorbing material, and binder. A foam scaffold is then impregnated with this emulsion. The binder is typically but not necessarily present at about 3-6 weight percent of the weight of the air-absorption structure. The emulsion-impregnated foam scaffold may then be treated at a temperature below the freezing point of the emulsion; this helps to maintain the structure of the openings when the liquid phase is removed and thus prevents too much compacting of solid material. Alternatively or additionally, the foam scaffold can be dried at room temperature or in an oven.

A number of implementations have been described. Nevertheless, it will be understood that additional modifications may be made without departing from the scope of the inventive concepts described herein, and, accordingly, other embodiments are within the scope of the following claims.

What is claimed is:

1. A method of fabricating a three-dimensional air adsorbing structure, comprising:
   providing a three-dimensional portion of an open-celled foam having a starting shape and starting dimensions along three mutually perpendicular axes;
   forming the portion into a different shape than the starting shape, to create a structure, wherein the structure has smaller dimensions than the starting dimensions along at least one of the three mutually perpendicular axes; and either before or after the forming step, coupling an air-adsorbing material to the foam, to form the three-dimensional air-adsorbing structure.

2. The method of claim 1 wherein the forming step comprises compression molding.

3. The method of claim 1 wherein the forming step comprises heat setting.

4. The method of claim 1 wherein the forming step comprises cutting.

5. The method of claim 1 wherein the foam comprises a skeletal, porous scaffold having scaffold openings distributed within the volume of the scaffold, where the scaffold openings make up at least about 50% of the volume of the scaffold.

6. The method of claim 1 wherein the foam comprises an open-celled hydrophilic foam.

7. The method of claim 1 wherein the air-adsorbing material comprises air-adsorbing material particles.

8. The method of claim 7 wherein the coupling step comprises providing a binder that couples air-adsorbing material particles to each other to form agglomerates and couples particles and agglomerates to the foam.

9. The method of claim 8 wherein the air-adsorbing material and the agglomerates are coupled to the foam by creating a water-based emulsion of air-adsorbing material, agglomerates of the material, and binder, and then impregnating the foam with the emulsion.

10. The method of claim 9 wherein the emulsion-impregnated foam is treated at least in part at a temperature below the freezing point of the emulsion.

11. The method of claim 7 wherein the three-dimensional air-adsorbing structure has structure openings in the agglomerates and structure openings between agglomerates, where the structure openings between agglomerates have an apparent diameter, at least some such structure openings being open to the outside environment, and wherein the openings in the structure further comprise a plurality of channels in the structure that have diameters of greater than the apparent diameter of the structure openings between agglomerates.

12. The method of claim 11 wherein the channels are created before the coupling step.

13. The method of claim 12 wherein the channels comprise blind holes.

14. The method of claim 11 wherein the three-dimensional air-adsorbing structure has a varied thickness, and there are more channels in thicker locations as compared to thinner locations.

15. The method of claim 11 wherein some of the channels have different diameters than other channels.

16. The method of claim 11 wherein channels have non-uniform diameters.

17. The method of claim 1 wherein the foam comprises a melamine-based foam or a polyurethane-based foam or a metal foam or a ceramic foam.

18. The method of claim 1 wherein the structure comprises a plurality of separate pieces of foam with air-adsorbing material coupled to it.

19. The method of claim 18 wherein the separate pieces are formed such that they interlock with each other, so as to create a larger structure comprising a plurality of interlocked pieces of foam with air-adsorbing material coupled to it.

20. The method of claim 1 wherein the different shape than the starting shape is a flat shape with a thickness of no more than about 3 mm.

21. The method of claim 1 further comprising placing a strengthening insert into the air adsorbing structure.

22. The method of claim 21 wherein the strengthening insert is placed either before or after the coupling step.

23. The method of claim 21 wherein the strengthening insert is located in part in the air adsorbing structure and in part outside of the air adsorbing structure.

24. The method of claim 21 wherein the strengthening insert is insert molded along with the foam.

* * * * *